United States Patent [19]
Frost et al.

[11] 3,828,619

[45] Aug. 13, 1974

[54] HUB OR BEARING HOUSING, PULLEY AND METHOD OF MAKING THE SAME

[75] Inventors: Charles C. Frost, Kentwood; Siegfried K. Weis, Grand Rapids, both of Mich.

[73] Assignee: C. L. Frost & Sons, Inc., Grand Rapids, Mich.

[22] Filed: Apr. 12, 1973

[21] Appl. No.: 350,342

Related U.S. Application Data

[62] Division of Ser. No. 199,985, Nov. 18, 1971.

[52] U.S. Cl. ............................ 74/230.01, 29/159 R
[51] Int. Cl. ....................... F16h 55/36, B21d 53/26
[58] Field of Search .......... 74/230.5, 230.8, 230.01; 29/159

[56] References Cited
UNITED STATES PATENTS

| | | | |
|---|---|---|---|
| 3,080,644 | 3/1963 | Previte et al. | 74/230.01 UX |
| 3,225,614 | 12/1965 | Skinner et al. | 74/230.01 |
| 3,335,597 | 8/1967 | Gobien | 129/159 R X |
| 3,566,503 | 3/1971 | Pacak | 29/159 R |
| 3,700,382 | 10/1972 | Pacak | 29/159 R |
| 3,712,098 | 1/1973 | Shaffer et al. | 29/159 R X |
| 3,719,980 | 3/1973 | Van Bussel | 29/159 R |

*Primary Examiner*—Leonard H. Gerin
*Attorney, Agent, or Firm*—Price, Heneveld, Huizenga & Cooper

[57] ABSTRACT

This invention relates to a novel hub or bearing housing, pulley, and the like and to the method of fabricating such hub or bearing housings, grooved metal pulleys, and the like in which a hub flange forming the housing is formed from a one-piece metal disk utilizing metal-splitting techniques. The disk is provided with an inner opening in its central portion and is held between a pair of die members between the inner opening and its outer diameter thereby leaving the inner opening free so that the disk may be split and expanded toward the die. Flanges formed on the inner diameter of the die are shaped to receive and form a hub or bearing housing in the disk as the material is split and expanded toward the die. In another embodiment of the invention, a pulley groove and bearing housing are formed from a one-piece metal disk in a simultaneous splitting operation. Flanges on the inner and outer diameters of a pair of cooperating die members are shaped to receive and form a hub or bearing housing about the inner diameter while simultaneously receiving and forming the rim or pulley groove about the outer diameter of the disk.

7 Claims, 7 Drawing Figures

HUB OR BEARING HOUSING, PULLEY AND METHOD OF MAKING THE SAME

CROSS REFERENCE TO RELATED APPLICATION

This is a division of application Ser. No. 199,985, filed Nov. 18, 1971.

BACKGROUND OF THE INVENTION

Various methods and apparatus have been devised utilizing rim-splitting techniques to form pulleys and the like. As is well known to those skilled in the art, a pulley blank in the form of a circular disk is clamped for rotation about its central axis. The periphery is then engaged with a splitting tool and is split and formed about its outer periphery to form the conventional V-groove. A separate bearing housing is then fixed into the central portion of the disk and is secured by welding, staking, or the like.

Bearing housings are formed by stamping or drawing a metal blank to provide a cup-shaped central housing forming one half of the bearing retainer. The other half of the retainer is formed as a second separate piece and is secured to the first blank as by welding, rivets or the like to hold the bearing in position.

SUMMARY OF THE INVENTION

As contrasted to these usual methods of forming a pulley, bearing housing, or the like, the present invention provides a construction wherein the hub portion is formed by splitting techniques. As will be more fully described hereinafter, although this may be performed in a separate operation within one aspect of the invention, it may also be performed simultaneously with the splitting of the outer diameter to form the V-groove of the pulley. In a preferred embodiment, the bearing housing is formed by splitting the central portion of the pulley or the like to form a bearing retainer opened at one end which is subsequently rolled over to securely hold a bearing such as an antifriction bearing, a bushing, or the like in the said central portion.

Accordingly, it is an object of the present invention to provide a hub, bearing housing or the like rapidly and economically by utilizing splitting techniques.

Another object of the invention is to provide a pulley or wheel from a metal disk wherein the bearing housing of the pulley is formed by splitting and forming the disk.

It is yet another object of the present invention to provide a wheel or pulley formed from a metal disk wherein the rim and the hub portions are split and formed simultaneously.

Another object of the present invention provides a pulley having a split rim and hub wherein the split hub forms a bearing retainer.

These and other important objects and advantages of this invention will be readily understood by those skilled in the art upon reading the following specification with reference to the accompanying drawings in which.

DESCRIPTION OF THE PREFERRED EMBODIMENT

Figure 1:
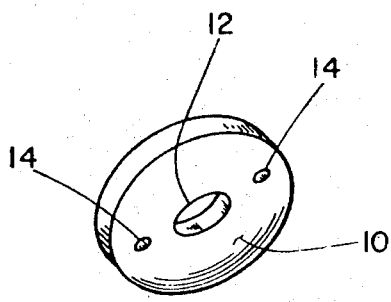
FIG. 1 is a perspective view of a flat, disk-like metallic material from which a hub bearing housing, pulley, or the like may be formed in accordance with the present invention.

Referring now to the figures, in particular FIG. 1, a disk-like pulley blank 10 is illustrated. The blank may be formed from a sheet or strip of suitable ductile material by stamping, punching, blanking, or other conventional cutting operation. The blank is substantially flat on both sides and is provided with a central opening 12 and a pair of radially oppositely directed drive-mounting holes 14, the purpose of which will be more fully described hereinafter.

Figure 2:
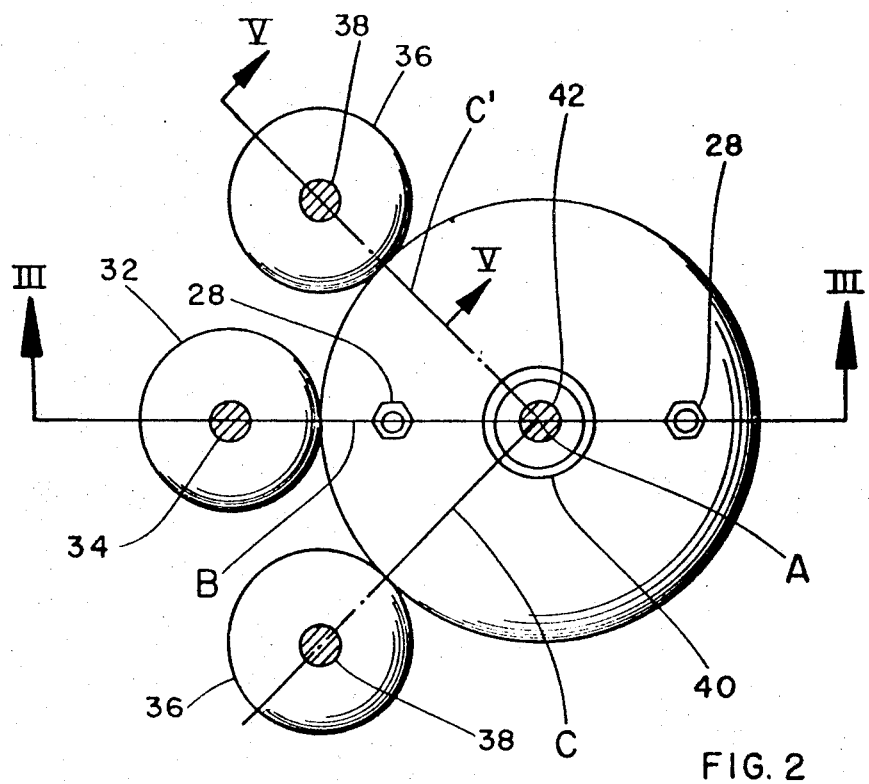
FIG. 2 is a somewhat schematic side-elevational view of the disk and the tools employed in the present invention.
Figure 3:
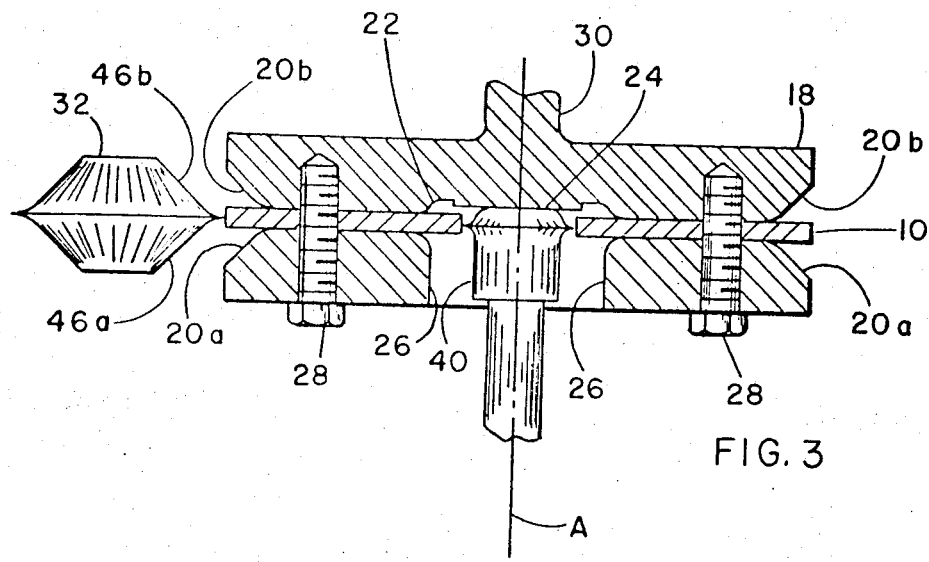
FIG. 3 is a cross-sectional view taken along the plane III—III of FIG. 2 illustrating the workpiece holding die and splitting tools prior to the splitting operation.

Referring now to FIGS. 2 and 3, the blank 10 is positioned between a pair of axially aligned circular die members 16 and 18. The die members have opposed beveled faces 20a and 20b forming an outer ring of the completed pulley. The central portion of die member 18 is provided with a beveled face 22 and a hub-forming projection 24. The corresponding die 16 is provided with an opening having walls 26 which form the opposite side of the hub in the completed pulley. Blank 10 is fixed to and held between die members 16 and 18 by means of screws 28 which pass through an opening formed in the die member 16 through the drive holes 14 in the disk 10 and which are threadably received in the die member 18. Die member 18 may also be provided with an integrally formed axially extending shank 30 so that the assembled die sections may be placed in a lathe chuck (not shown). Alternately the die assembly may be mounted on a face plate of a lathe for rotation about an axis A passing through the center of the die members 16 and 18 and the disk 10.

Figure 4:
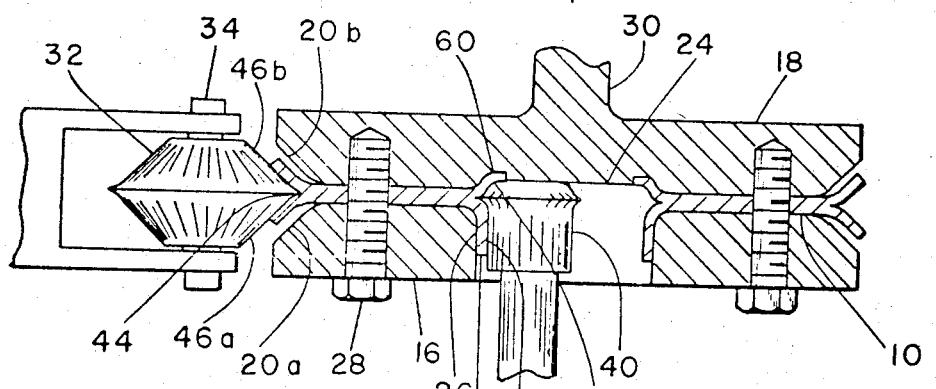
FIG. 4 is a cross-sectional view similar to FIG. 3 illustrating the rim and hub-splitting operation.

Referring now additionally to FIG. 4, the die members 16 and 18 are positioned within the suitable rotating apparatus, such as, for example, a lathe, and a plurality of cutting and forming tools are suitably located for operation on the rotating workpiece, i.e., disk 10. As will become immediately obvious to those skilled in the art, the particular mechanisms used to accomplish the toolholding functions and rotation of the workpiece are conventional. For purposes of illustration, these functions will be described herein with reference to a lathe.

A rim-splitting tool or parting roller 32 is positioned adjacent the outer diameter of the disk 10 and is mounted for rotation about a shaft 34. Shaft 34 may be suitably held in a tool holder 35 which may be mounted in a tool post (not shown) or other conventional mounting so that it may be advanced toward and away from the axis of rotation of the workpiece. A pair of forming tools or forming rollers 36 are similarly mounted on shafts 38 in a tool holder (not shown) for rotation and advancement toward and away from the central axis of rotation as will be more fully described hereinafter.

A centrally located combination splitting and forming tool or parting roller 40 is provided and extends into the opening 12 formed in the center of the disk 10. Parting roller 40 is mounted for rotation on a shaft 42 and may be carried by a suitable tool holder for movement within the opening in the disk about an axis toward and away from the splitting tool 32.

Figure 5:
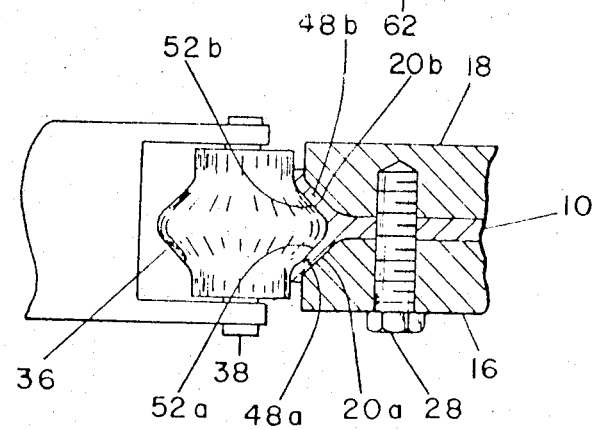
FIG. 5 is a cross-sectional view taken along the plane IV—IV of FIG. 2 illustrating the pulley rim forming tool.

The splitting and forming tools illustrated in more detail in FIGS. 3, 4, and 5 are conventional in construction and purpose as will be immediately obvious to those skilled in the art. Parting tool 32 rotatable about shaft 34 is essentially a roller having an annular cutting or parting edge 44 and tapered side walls 46a and 46b corresponding essentially to the beveled edge surfaces 20a and 20b of die members 16 and 18. As the disk is rotated, the parting tool 32 is fed at a predetermined rate into the peripheral edge of the disk 10 causing the lateral sides of the disk to separate and begin the formation of rim flanges 48a and 48b (FIG. 4). Forming tools 36 are similarly constructed and are rotatable about the shaft 38. The forming tool 36 (FIG. 5) is provided with a broad, blunt annular edge portion 50 and tapered sides 52a and 52b. After the parting tool 32 has completed its travel into the workpiece to form the rim flanges 48a and 48b, forming tools 36 are urged between the split flanges to force the flanges apart toward the side walls 20a and 20b of the die members 16 and 18 to form the outer rim of the completed pulley.

The centrally located parting and forming tool 40 is mounted for rotation about shaft 42 and is, like parting and forming tools 32 and 36, basically a roller having an annular parting edge 54, a first tapered side 56, and a second tapered side 58. The sides 56 and 58 correspond to the surfaces 22 and 26 formed in the die members 18 and 16 respectively. As the disk is rotated with the die members 16 and 18, the parting tool 40 is fed at a predetermined rate into the side walls defining the opening 12 in the central portion of the disk. This causes the material to split into a pair of oppositely directed hub-forming flanges 60 and 62. The tool 40 is advanced into the disk a sufficient distance to both split the material and to force the flanges outwardly against the die surfaces 22 and 26 to form a bearing received hub within the disk.

The relative positioning and movement of the splitting and forming tools during the operations performed on the disk is within a narrow aspect of the invention a very important feature. As illustrated in FIG. 2, the splitting and forming tools 32 and 42 are positioned on a line B perpendicular to the axis of rotation A and are simultaneously moved toward each other during the splitting operation. Forming tools 36 are positioned on either side of the line B about lines C and C' which bisect the angle formed by the line B and a line D passing through the axis of rotation forming right angles with line B.

In operation, parting wheels 32 and 42 simultaneously move toward each other to split the rim and hub portions of the pulley blank or disk 10. Preferably, splitting tool 32 completes its limit of travel toward the center of the disk before splitting and forming tool 42 completes its outward travel to form the hub. When splitting tool 32 has completed the splitting operation of the rim and has formed the flanges 48a and 48b, tool 42 has only partially completed its splitting and forming operation. Forming tools 36 are then urged along the lines C and C' toward the center axis of the disk to urge the flanges 48a and 48b outwardly against die members 16 and 18 to form the desired shape while splitting and forming tool 40 completes its operation.

The positioning of the tools together with the simultaneous splitting and forming operation balances the forces required to split and form the hub and rim. As a result, the stresses and strains applied to the work head of the rotating mechanism holding the workpiece are reduced considerably. The simultaneous forming and splitting operations may be performed at relatively high speeds, depending, of course, upon the particular material employed.

When the splitting and forming operations are completed, the tools are withdrawn and the completed pulley may be removed from the die members by simply removing the screws 28. At that point, the outer rim 48 is completely formed and the hub portion formed about the opening 12 is uniquely adapted to receive a bearing, a bushing, or the like.

Figure 6:
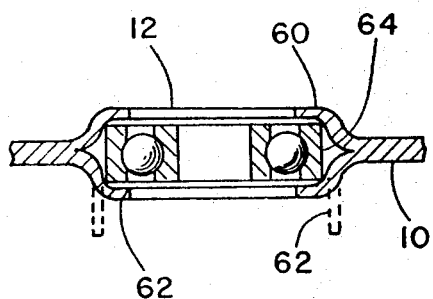
FIG. 6 is a cross-sectional view of a pulley after completion of the splitting and forming operations and having a bearing fixed in the hub portion.

Referring briefly to FIG. 6, the hub of the pulley is illustrated in cross section and has a bearing 64 installed therein. The flange 60, formed in the die member 18, is substantially flat and parallel to one side of the disk 10 while the opposed flange 62 extends radially outward (as shown in FIG. 4 and is illustrated in phantom in FIG. 6). A bearing 64 is positioned within the opening formed by the flange 62 and flange 62 is rolled over to the position shown in FIG. 6. Flange 62 then assumes the same relative position with respect to the center of the disk as flange 60 and the bearing 64 are securely held therein.

Figure 7:
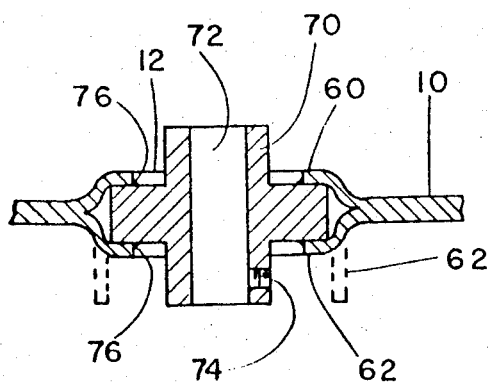
FIG. 7 is a cross-sectional view similar to FIG. 6 illustrating a hub member or bushing fixed in the pulley.

The idler pulley illustrated in FIG. 6 may be modified as shown in FIG. 7 for mounting on a shaft and for rotation therewith by fixing a hub member or bushing 70 between the flanges 60 and 62. The bushing may be provided with a finished axial bore 44 rotatable about a shaft upon which it is mounted or it may be provided with a drilled, tapped hole 74 to receive a set screw (not shown) for securing the pulley to a shaft. Alternately, the hub or bushing 70 may be provided with a keyway, spline, or other desirable internal configuration to prevent rotation between the pulley and shaft.

As a result of the unique construction herein described, the simultaneously formed hub and rim are concentric with respect to each other. The completed pulley inherently has great strength as the thickness of the pulley web is equal to the combined thickness of the flanges. The bearing inserted within the hub does not require seals and shields as would a conventional bearing because the hub flanges 60 and 62 form a shield and seal the bearing lubricants within the hub. The simultaneous forming and splitting operation reduces the time involved to produce a completed pulley with a resultant significant reduction in total production costs. In addition, the hub portion formed as a bearing holder allows for rapid and easy placement of a bearing, bushing, or the like within the hub thereby eliminating expensive and time-consuming staking, welding, or riveting operations.

While the method described herein relates to the simultaneous splitting and forming of the hub and rim on a pulley, it is within the concept of the invention to provide a bearing housing alone through the utilization of the above-described splitting and forming technique, such housing finding utility for use with any type of rotating mechanism.

As will become obvious to those skilled in the art, many modifications may be made to the method described herein. For example, a single cutting and forming tool 32 may be utilized rather than the separate forming tools 36. Tools may also be provided for forming radial grooves or other markings on the inner surfaces of the flanges 20a and 20b to provide various surfaces for use with drive belts operating under differing conditions. Other variations and modifications will be suggested to those skilled in the art without departing from the scope of the invention which is defined by the following claims.

The embodiments of the invention in which an exclusive property or privilege is claimed are defined as follows:

1. An article of manufacture comprising an integral one-piece pulley wheel formed from a metallic disc, said disc having a split formed outer peripheral rim and a split formed centrally located bearing housing.

2. An integral hub or bearing housing comprising: a metallic disk having a split bearing retaining means formed in the central portion thereof, said retaining means including a pair of annular flange members extending outwardly from said disk, one of said flange members being formed radially inwardly to form one-half of said retaining means, the other of said flange members forming a hub or bearing receiving opening and bendable radially inwardly to form the other half of said retaining means.

3. A pulley wheel comprising:
    a metallic disk having an opening formed in the central portion thereof;
    a pair of oppositely flared flange members split and formed in said disk about said central opening, said flange members cooperable to hold a bearing member therebetween in said disk; and
    a split, oppositely flared, rim portion on the outer periphery of said disk forming a groove concentric with said split flange members.

4. A pulley wheel as defined in claim 3 and further including a bearing member positioned between said oppositely flared split flange members.

5. A pulley wheel as defined in claim 4 wherein said bearing member is an antifriction bearing.

6. A pulley wheel as defined in claim 4 wherein said bearing member is a bushing.

7. A pulley wheel as defined in claim 6 and further including means on said bushing for securement of said bushing to a shaft.

* * * * *